US009019217B2

(12) United States Patent
Iida

(10) Patent No.: US 9,019,217 B2
(45) Date of Patent: Apr. 28, 2015

(54) TOUCH INPUT LOCATION CORRECTION DEVICE, INPUT DEVICE, TOUCH INPUT LOCATION CORRECTION METHOD, AND PROGRAM AND INTEGRATED CIRCUIT USED FOR TOUCH INPUT LOCATION CORRECTION APPARATUS

(75) Inventor: Shigehiro Iida, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 362 days.

(21) Appl. No.: 13/391,938

(22) PCT Filed: Apr. 27, 2011

(86) PCT No.: PCT/JP2011/002462
§ 371 (c)(1),
(2), (4) Date: Feb. 23, 2012

(87) PCT Pub. No.: WO2011/161864
PCT Pub. Date: Dec. 29, 2011

(65) Prior Publication Data
US 2012/0146931 A1 Jun. 14, 2012

(30) Foreign Application Priority Data
Jun. 25, 2010 (JP) ................ 2010-145576

(51) Int. Cl.
G06F 3/041 (2006.01)
G06F 3/0488 (2013.01)
(52) U.S. Cl.
CPC ................... G06F 3/0418 (2013.01)
(58) Field of Classification Search
CPC ............. G06F 3/0418; G06F 2203/0418
USPC .............................. 345/156–178
See application file for complete search history.

(56) References Cited

U.S. PATENT DOCUMENTS 8,044,940 B2 10/2011 Narusawa
2008/0309640 A1* 12/2008 Hong ........................ 345/173
(Continued)

FOREIGN PATENT DOCUMENTS

CN 101446882 A 6/2009
JP 2002-55781 2/2002
(Continued)

OTHER PUBLICATIONS

International Search Report issued Jul. 5, 2011 in corresponding International Application No. PCT/JP2011/002462.
(Continued)

Primary Examiner — Ryan A Lubit
Assistant Examiner — Lisa Landis
(74) Attorney, Agent, or Firm — Wenderoth, Lind & Ponack, L.L.P.

(57) ABSTRACT

A touch input location correction device (112) includes: a touch location detecting unit detecting a set of touch point coordinates; a user operation determining unit (105) determining details of an operation; a touch portion shift detecting unit (106) detecting a first state transition at a first time point during which the portion of the user is sliding on a touch area, the first state transition showing transition from a state where the user touches the touch area with both of a first portion and a second portion to a state where the user touches the touch area only with the second portion; a touch point coordinate correcting unit (107) correcting a set of touch point coordinates of the second portion based on sets of touch point coordinates, of the first portion and the second portion, before the first time point and outputting the corrected set of touch point coordinates.

10 Claims, 7 Drawing Sheets

(56) References Cited

U.S. PATENT DOCUMENTS

2009/0135153 A1   5/2009   Narusawa
2009/0244031 A1*  10/2009  Westerman et al. .......... 345/174

FOREIGN PATENT DOCUMENTS

| JP | 2003-5913 | 1/2003 |
| JP | 2005-234958 | 9/2005 |
| JP | 2008191791 | * 8/2008 |

OTHER PUBLICATIONS

Office Action with Search Report issued Feb. 4, 2015 in corresponding Chinese Patent Application No. 201180003443.0 (with English translation of Search Report).

* cited by examiner

TOUCH INPUT LOCATION CORRECTION DEVICE, INPUT DEVICE, TOUCH INPUT LOCATION CORRECTION METHOD, AND PROGRAM AND INTEGRATED CIRCUIT USED FOR TOUCH INPUT LOCATION CORRECTION APPARATUS

TECHNICAL FIELD

The present invention relates to a technique for improving the operability of input devices by correcting the shift, of the touch portion of a finger, made in a single operation on an unexpected touch area.

BACKGROUND ART

Consumer electronics appliances, such as recent TVs and Blu-ray disc recorders, are equipped with network-compatible applications to offer services other than conventional services including providing TV programs. One of such services is provided via a viewer application to browse many pictures obtained through a network.

Unfortunately, users cannot fully take advantage of such applications with conventional remote controls having only directional pads, numeric keypads, and enter keys. In order to overcome the problem, touch pads or touch screens are used as input devices to allow the users to operate the applications more versatilely. Such input devices make it possible to accomplish the operations what conventional remote controls cannot, including scrolling, such that the users keep their fingers touched on the touch screen and vertically and horizontally slides the point of the touch across the panel.

Compared with the conventional remote controls, the input devices including the touch screen or the touch pad provide the users various operations; however, the users inadvertently cause incorrect operations of the input devices. Such incorrect operations need to be prevented. One of the incorrect operations is that two or more portions of the finger accidentally touch the device at a time, which makes it impossible for the user to carry out his or her intended scrolling.

A conventional device disclosed in Patent Reference 1, for example, has the following feature: When the device detects another touch portion of the finger while the user is operating the device, the device determines whether the other portion is due to an intended operation of the user or to an incorrect operation. According to Patent Reference 1, the point that the device detects first is determined as a first touch point, and a point which the device detect after the first touch point is determined as an additional touch point. Then, the device determines whether the additional touch point is made with a touch by the intended operation of the user or with an inadvertent touch by an incorrect operation, based on the position and the moving history of the coordinates of the first touch point.

CITATION LIST

Patent Literature

[PTL 1]
Japanese Unexamined Patent Application Publication No. 2002-55781

SUMMARY OF INVENTION

Technical Problem

The above device, however, cannot detect the change of a touch portion when the touch point shifts in a single operation. Thus, the user cannot operate the device smoothly since the device fails to make the correction of the touch location due to the change of the touch portion. Exemplified hereinafter is the cause of the problem with reference to FIGS. 7 to 9.

FIG. 7 shows a correspondence relationship between the input operation of a user and displayed output.

A finger 301 is the user's finger with which the user operates an input device. A touch pad 302 is an input device which detects the input operation of the user via finger pressure. A user input operation direction 303 shows the direction in which an input operation is provided on the touch pad 302 by the user. A display 304 provides the result of the input operation by the user. A cursor 305 is displayed on the display 304. A cursor moving direction 306 shows the direction in which the cursor 305 moves on the display 304 as the user carries out an input operation.

The user touches the touch pad 302 with the finger 301 and moves the finger 301 toward a direction which the user input operation direction 303 shows. Hence, the cursor 305 displayed on the display 304 moves in the direction which the cursor moving direction 306 shows.

FIGS. 8A to 8C show portions of the finger 301 which touch the touch pad 302 in the input operation by the user.

FIG. 8A shows how the moving finger 301 touches the upper area of the touch pad 302. According to FIG. 8A, only the ball of the finger (a first portion 401) touches the touch pad 302. FIG. 8B shows how the moving finger 301 touches the middle area of the touch pad 302. According to FIG. 8B, both of the ball of the finger (the first portion 401) and the finger tip (a second portion 402) simultaneously touch the touch pad 302. FIG. 8C shows how the moving finger 301 touches the lower area of the touch pad 302. According to FIG. 8C, only the finger tip (the second portion 402) touches the touch pad 302.

When the user achieves the scrolling from the upper area to the lower area of the touch pad 302 as described above, the portions of the finger 301 that touch the touch pad 302 usually change in the order of FIGS. 8A, 8B, and 8C.

FIG. 9 shows positions of coordinates on a touch pad when the user carries out an input operation.

In FIG. 9, the horizontal axis and the vertical axis respectively show time and Y-coordinates of the touch pad 302. FIG. 9 depicts graphs showing the values of the Y-coordinates detected when the user carries out scrolling in the user input operation direction 303 shown in FIG. 7. The values of the Y-coordinates on the touch pad 302 increase toward the bottom end of the touch pad 302, with the top end set 0.

One of the graphs in FIG. 9 uses stars each having five vertices to show touch points inputted with the first portion (the ball of the finger) 401 in FIGS. 8A and 8B. The other graph in FIG. 9 uses stars each having four vertices to show touch points inputted with the second portion (the finger tip) 402 in FIGS. 8B and 8C.

The time period between the time 0 and time t1 shows how a portion of the finger 301 touches the touch pad 302 as shown in FIG. 8A. In the time period, specifically, only detected are sets of coordinates of the touch points where the first portion (the ball of the finger) 401 touches the touch pad 302 in FIG. 8A. The time period between the time t1 and time t2 shows how portions of the finger 301 touch the touch pad 302 as shown in FIG. 8B. Detected here are sets of coordinates for two touch points since the first portion (the ball of the finger) 401 and the second portion (finger tip) 402 in FIG. 8B simultaneously touch the touch pad 302. The time period between the time t2 and time t3 shows how a portion of the finger 301 touches the touch pad 302 as shown in FIG. 8C. In other words, only detected are sets of coordinates of the touch points where the second portion (the finger tip) 402 touch the touch pad 302 in FIG. 8C.

It is noted that, in the case where the conventional input device has simultaneously two or more touch points inputted, such as touch points 501 and 502 simultaneously inputted at the time t1, and touch points 503 and 504 simultaneously inputted at the time t2, the input of touch points 502 and 504 of the second portion 402 is ignored. The technique disclosed in Patent Reference 1 has a feature that, when two or more touch points are inputted, the technique distinguishes a touch point of the first portion 401 which starts to give a temporal first touch from an additional touch point of the second portion 402 which starts to give a touch later than the first portion 401 does, and uses only the values of the coordinates of the touch point of the first portion 401.

In the case where a touch point 505 is inputted, however, only one touch point is recognized. Thus, the input is not ignored. Specifically, suppose when the touch portions of the finger 301 shifts from the ones in FIG. 8B to the one in FIG. 8C while the user is carrying out scrolling on the touch pad 302 in the user input operation direction 303 shown in FIG. 7. Here, as the touch portions of the finger 301 shift, the touch point on the touch pad 302 shifts upward on the touch pad 302. Thus, the device disclosed in Patent Reference 1 has a problem in that the touch point cannot shift smoothly in a single direction in a certain distance. In the example of FIG. 9, this problem develops when the touch point shifts from the touch point 503 to the touch point 505.

As described in the above problem, the cursor 305 on the display 304 shifts in a direction opposite the cursor moving direction 306, contrary to the user's intention that the user wishes to move the cursor 305 in the cursor moving direction 306. Then, the cursor 305 again moves in the cursor moving direction 306. Such a problem prevents the user from moving the cursor in a single direction in a certain period which the user intends to move. The problem is especially noticeable when the user moves the cursor with his or her finger having a long fingernail.

The present invention is conceived in view of the above problem and has as an object to make the shift of a touch portion, which bothers the user in a single operation, hardly detectable to the user, and allow him or her to achieve more comfortable input operation.

Solution to Problem

A touch input location correction device according to an aspect of the present invention corrects a touch input location indicating a touch location of a user on a touch area. Specifically, the touch input location correction device includes: a touch location detecting unit which detects a set of touch point coordinates for each portion of the user which touches the touch area, the set of touch point coordinates being a set of coordinates corresponding to a touch location of the portion and found on the touch area; a user operation determining unit which determines details of an operation carried out by the user based on the set of touch point coordinates detected by the touch location detecting unit; a touch portion shift detecting unit which detects a first state transition based on the set of touch point coordinates detected by the touch location detecting unit at a first time point in a time period during which the user operation determining unit determines that the portion of the user is sliding on the touch area, the first state transition showing transition from a state where the user touches the touch area with both of a first portion and a second portion of the user to a state where the user touches the touch area only with the second portion; and a touch point coordinate correcting unit which (i) corrects a set of touch point coordinates of the second portion based on sets of touch point coordinates, of the first portion and the second portion, detected by the touch location detecting unit before the first time point and (ii) outputs the corrected set of touch point coordinates as the touch input location, the correction and the output being executed after the touch portion shift detecting unit detects the first state transition in the case where the set of touch point coordinates of the first portion is outputted as the touch input location until immediately before the first time point.

According to the above structure, the touch input location to be outputted smoothly moves before and after the first state transition. As a result of the feature, the user feels less uncomfortable when the touch portion changes.

The touch point coordinate correcting unit may correct the set of touch point coordinates of the second portion by (i) holding, as a correction value, a difference between the sets of touch point coordinates of the first portion and the second portion detected by the touch location detecting unit before the first time point and (ii) adding the correction value to the set of touch point coordinates, of the second portion, observed after the first time point.

The touch portion shift detecting unit may: determine an estimating area based on the set of touch point coordinates of the first portion detected by the touch location detecting unit before the first time point, the estimating area indicating an area in which the first portion is estimated to touch the touch area at the first time point; and detect the first state transition in the case where (i) the set of touch point coordinates detected by the touch location detecting unit at the first time point is located outside the estimating area and (ii) at least part of a circle overlaps with the estimating area, the circle having a center positioned at the set of touch point coordinates and a radius indicated in the correction value.

The touch portion shift detecting unit may further: detect a second state transition when the touch location detecting unit detects two sets of touch point coordinates at a second time point (i) in a time period during which the user operation determining unit determines that the portion of the user is sliding on the touch area and (ii) observed before the first time point, the second state transition showing transition from a state where the user touches the touch area only with the first portion to the state where the user touches the touch area with both of the first portion and the second portion; and determine, as the set of touch point coordinates of the first portion, one of the two sets of touch location coordinates which is located in the estimating area determined based on the set of touch point coordinates of the first portion detected by the touch location detecting unit before the second time point, the two sets of touch location coordinates being detected by the touch location detecting unit at the second time point.

The touch point coordinate correcting unit may avoid outputting the touch input location in the case where at least part of the circle, whose center is the set of touch point coordinates and whose radius is the correction value, does not overlap with the estimating area. Such a situation develops when, for example, the user cancels the scrolling and starts another operation. Thus, instead of outputting the touch input location, the touch point coordinate correcting unit may desirably wait and see the situation.

The touch point coordinate correcting unit may set the correction value to zero in the case where the set of touch point coordinates detected by the touch location detecting unit is continuously located, for predetermined times, outside the estimating area determined immediately before. This feature makes it possible to effectively prevent the correction processing from continuously being executed even though the scrolling has ended.

The touch input location correction device may further include a touch point information holding unit which holds the set of touch point coordinates for each time the touch location detecting unit detects the set of touch point coordinates. The user operation determining unit may determine whether or not the portion of the user is sliding on the touch area, based on two or more of previous sets of touch point coordinates held in the touch point information holding unit.

An input device according to an aspect of the present invention includes: a touch input unit including a touch area; and the above-described touch input location correction device.

As an example, the input device may output the touch input location to an external device so as to control the external device, the touch input location being generated based on a user operation received on the touch area. For example, the external device may be one of: a display device which includes a display screen, and displays on the display screen a pointer at a location corresponding to the touch input location obtained from the input device; an audio output device which includes a speaker, and outputs audio from the speaker at a volume set based on the touch input location obtained from the input device; and a driving device which includes a motor, and drives the motor based on the touch input location obtained from the input device.

A touch input location correction method according to an aspect of the present invention involves correcting a touch input location indicating a touch location of a user on a touch area. Specifically, the touch input correction method includes: detecting a set of touch point coordinates for each portion of the user which touches the touch area, the set of touch point coordinates being a set of coordinates corresponding to a touch location of the portion and found on the touch area; determining details of an operation carried out by the user based on the set of touch point coordinates detected by the touch location detecting unit; detecting a first state transition based on the set of touch point coordinates detected by the touch location detecting unit at a first time point in a time period during which the user operation determining unit determines that the portion of the user is sliding on the touch area, the first state transition showing transition from a state where the user touches the touch area with both of a first portion and a second portion of the user to a state where the user touches the touch area only with the second portion; and correcting a set of touch point coordinates of the second portion based on sets of touch point coordinates, of the first portion and the second portion, detected by the touch location detecting unit before the first time point, and outputting the corrected set of touch point coordinates as the touch input location, the correction and the output being executed after the touch portion shift detecting unit detects the first state transition in the case where the set of touch point coordinates of the first portion is outputted as the touch input location until immediately before the first time point.

A non-transitory computer-readable recording medium for use in computer according to an aspect of the present invention has a computer program, which causes a computer to correct a touch input location indicating a touch location of a user on a touch area, recorded thereon. Specifically, the program causes the computer to execute: detecting a set of touch point coordinates for each portion of the user which touches the touch area, the set of touch point coordinates being a set of coordinates corresponding to a touch location of the portion and found on the touch area; determining details of an operation carried out by the user based on the set of touch point coordinates detected by the touch location detecting unit; detecting a first state transition based on the set of touch point coordinates detected by the touch location detecting unit at a first time point in a time period during which the user operation determining unit determines that the portion of the user is sliding on the touch area, the first state transition showing transition from a state where the user touches the touch area with both of a first portion and a second portion of the user to a state where the user touches the touch area only with the second portion; and correcting a set of touch point coordinates of the second portion based on sets of touch point coordinates, of the first portion and the second portion, detected by the touch location detecting unit before the first time point, and outputting the corrected set of touch point coordinates as the touch input location, the correction and the output being executed after the touch portion shift detecting unit detects the first state transition in the case where the set of touch point coordinates of the first portion is outputted as the touch input location until immediately before the first time point.

An integrated circuit according to an aspect of the present invention corrects a touch input location indicating a touch location of a user on a touch area. Specifically, the integrated circuit includes: a touch location detecting unit which detects a set of touch point coordinates for each portion of the user which touches the touch area, the set of touch point coordinates being a set of coordinates corresponding to a touch location of the portion and found on the touch area; a user operation determining unit which determines details of an operation carried out by the user based on the set of touch point coordinates detected by the touch location detecting unit; a touch portion shift detecting unit which detects a first state transition based on the set of touch point coordinates detected by the touch location detecting unit at a first time point in a time period during which the user operation determining unit determines that the portion of the user is sliding on the touch area, the first state transition showing transition from a state where the user touches the touch area with both of a first portion and a second portion of the user to a state where the user touches the touch area only with the second portion; and a touch point coordinate correcting unit which (i) corrects a set of touch point coordinates of the second portion based on sets of touch point coordinates, of the first portion and the second portion, detected by the touch location detecting unit before the first time point and (ii) outputs the corrected set of touch point coordinates as the touch input location, the correction and the output being executed after the touch portion shift detecting unit detects the first state transition in the case where the set of touch point coordinates of the first portion is outputted as the touch input location until immediately before the first time point.

Advantageous Effects of Invention

The present invention corrects a set of coordinates, making the shift of the touch portion hardly detectable to the user. Thus, the user can achieve a comfortable input operation.

DESCRIPTION OF EMBODIMENTS

Described hereinafter are Embodiments of the present invention, with reference to the drawings.

[Embodiment]

Exemplified in an embodiment of the present invention is the case where a user uses the touch pad 302, which detects the input operation of the user through his or her finger pressure, to stroke the touch pad 302 from top to down with his or her finger 301 in order to move the cursor 305, appearing on the display 304, from top to down of the display 304. It is noted that the touch pad 302 used in the embodiment of the present invention simultaneously detects two or more touch points.

Described hereinafter are the details of the embodiment of the present invention, and a solution to the above problem in the embodiment.

Figure 1:
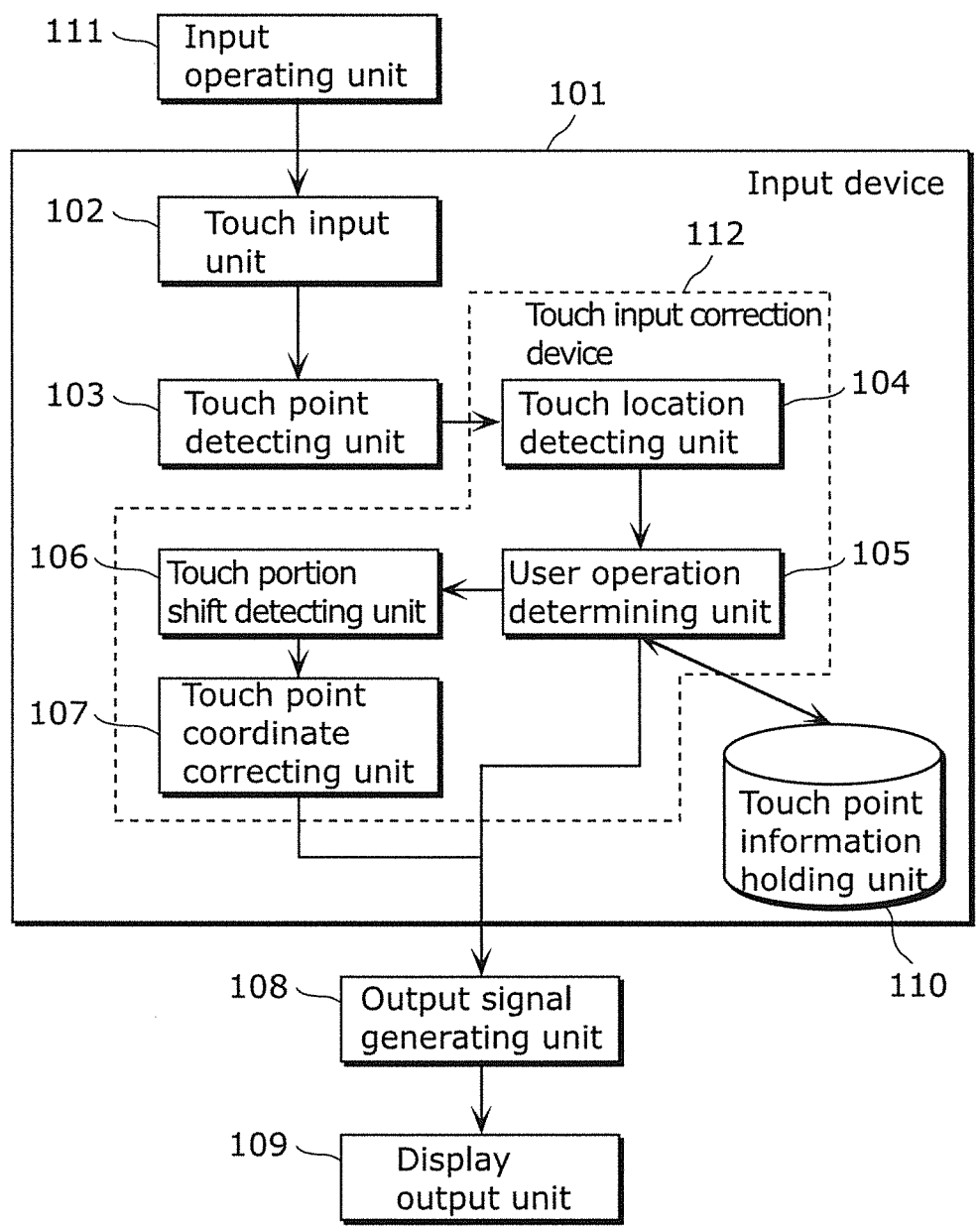
FIG. 1 depicts a schematic view of an input device and a touch input location correction device according to an embodiment of the present invention.

FIG. 1 depicts a schematic view of an input device 101 and a touch input location correction device 102 according to the embodiment of the present invention.

As shown in FIG. 1, the input device 101 includes a touch input unit 102, a touch point detecting unit 103, a touch point information holding unit 110, and the touch input location correction device 112. The input device 101 causes the touch input unit 102 to receive the operation carried out with an input operating portion 111, and outputs, to an external device, a touch input location obtained via the analysis of the operation details.

The input operation portion 111 is a part of the user's body. A typical input operation portion 111 is a fingertip of the user.

Figure 7:
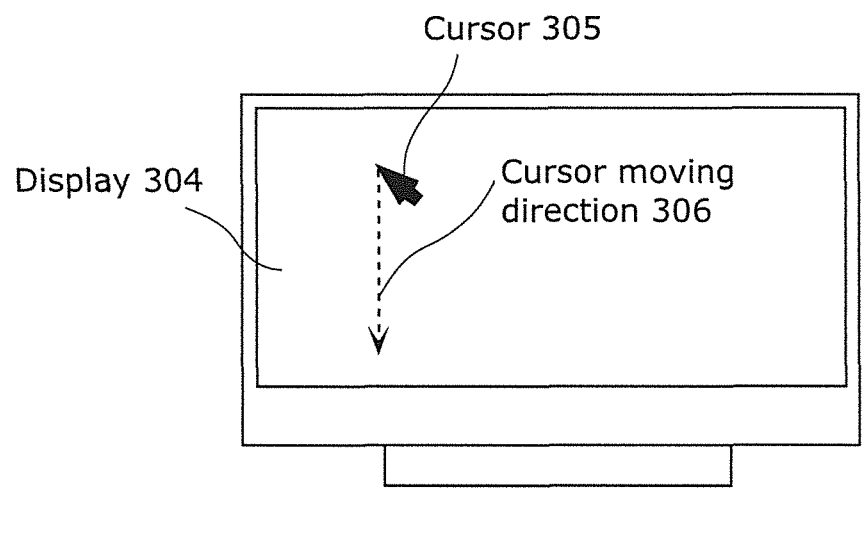
FIG. 7 shows a correspondence relationship between the input operation of a user and displayed output.
Figure 7:
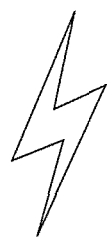
Figure 7:
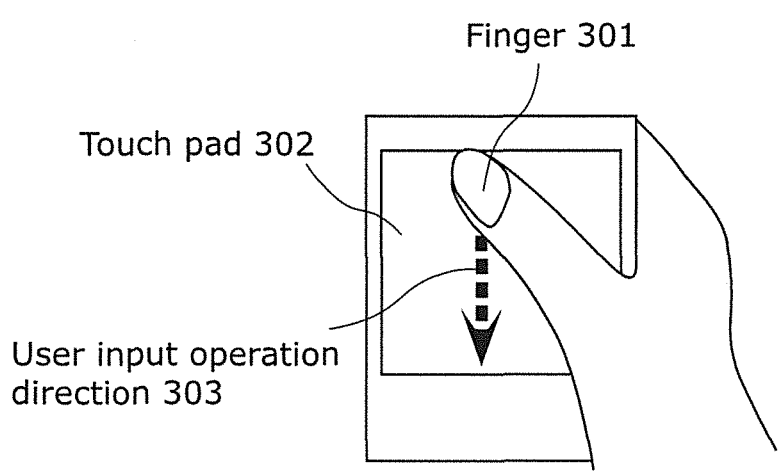

The touch input unit 102 is a pad area receiving the input operation carried out with input operation portion 111. As shown in FIG. 7, a typical example of the touch input unit 102 is the touch pad 302 having a touch area with a predetermined area. In other words, the input device 101 receives the input operation of the user through the movement of the finger 301 touching the touch pad 302.

The touch point detecting unit 103 detects the input received by the touch input unit 102. Specifically, in the case where the touch pad 302 employs the resistive system, the touch point detecting unit 103 detects, for each predetermined time period, a pressure value when the finger 301 of the user touches the touch pad 302, and outputs the pressure value to the touch input location correction device 112. In the case where the touch pad 302 employs the capacitive system, the touch point detecting unit 103 detects, for each predetermined time period, a capacitance value when the finger 301 of the user touches or reaches closer to the touch pad 302, and outputs the capacitance value to the touch input location correction device 112.

The touch input location correction device 112 includes a touch location detecting unit 104, a user operation determining unit 105, a touch portion shift detecting unit 106, and a touch point coordinate correcting unit 107. The touch input location correction device 112 calculates a touch input location based on an output signal from the touch point detecting unit 103. In the case where touch input location satisfies a predetermined condition, the touch input location correction device 112 corrects to output the touch input location.

The touch location detecting unit 104 detects where the touch point is on the touch pad 302, based on the information detected by the touch point detecting unit 103. More specifically, the touch location detecting unit 104 detects a set of touch point coordinates (hereinafter simply referred to as "set of coordinates") for each portion of the user which touches the touch area of the touch pad 302. Here, the set of touch point coordinates is a set of coordinates corresponding to a touch location of the portion and found on the touch area.

It is noted that the touch location detecting unit 104 might only infrequently miss obtaining the information on the touch point from the touch point detecting unit 103 due to a detection error caused by the touch point detecting unit 103. In such a case, for example, the touch location detecting unit 104 may either output the most-recently detected set of touch point coordinates or predict the current set of touch point coordinates based on two or more previously-detected sets of touch point coordinates.

The coordinate system in the embodiment is set so that the coordinates of the origin (X,Y)=(0,0) are located on the top-left corner of the touch pad 302 in FIG. 7. With respect to the origin, the X-coordinate increases toward right, and the Y-coordinate increases toward the bottom. In the case where two touch points are simultaneously found as shown in FIG. 8B, the touch location detecting unit 104 obtains a set of coordinates (X, Y) for each of the two touch points.

The user operation determining unit 105 holds, in the touch point information holding unit 110, the set of coordinates detected by the touch location detecting unit 104 as touch point information. The touch point information is used for determining the succeeding input operation. Furthermore, the user operation determining unit 105 determines the input operation which the user currently carries out. In the embodiment, the user operation determining unit 105 especially determines whether or not the finger 301 of the user is sliding on the touch area (Hereinafter, such operation is referred to as "scrolling").

It is noted that the user operation determining unit 105 may determine the user operation based either on (i) previous touch point information sets held in the touch point information holding unit 110 or (ii) the most recent touch point information set detected by the touch location detecting unit 104.

When the user operation determining unit 105 determines that the user is scrolling the touch pad 302, the touch portion shift detecting unit 106 detects, based on the touch point information, the shift of the touch portion of the input operation portion 111.

Specifically, the touch portion shift detecting unit 106 detects a first state transition and a second state transition. The first state transition shows transition from the state in FIG. 8B where the user touches the touch area with both of a first portion 401 and a second portion 402 to the state in FIG. 8C where the user touches the touch area only with the second portion 402. The second state transition shows the transition from the state in FIG. 8A where the user touches the touch area only with the first portion 401 to the state in FIG. 8B where the user touches the touch area with both of the first portion 401 and the second portion 402.

In the case where the touch portion shift detecting unit 106 detects the shift of the touch portion; specifically the first state transition, the touch point coordinate correcting unit 107 corrects the difference between the before-shift touch input location and the after-shift touch input location, and outputs the corrected difference.

Figure 8A:
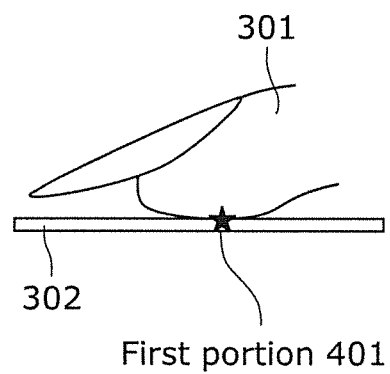
FIG. 8A shows how a moving finger touches the upper area of a touch pad.
Figure 8B:
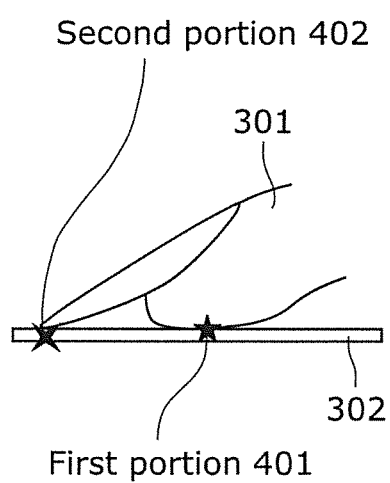
FIG. 8B shows how the moving finger touches the middle area of the touch pad.
Figure 8C:
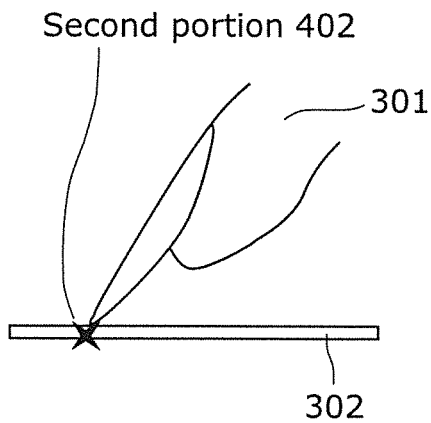
FIG. 8C shows how the moving finger touches the lower area of the touch pad.

Specifically, in the states in FIGS. 8A and 8B, the touch point coordinate correcting unit 107 directly outputs, as the touch input location, the set of touch point coordinates corresponding to the first portion 401. Moreover, the touch point coordinate correcting unit 107 previously holds, as a correction value, a difference between the sets of touch point coordinates of the first portion 401 and the second portion 402. Then, after the state in FIG. 8C (a first time point), the touch point coordinate correcting unit 107 outputs a touch input location which is the set of touch point coordinates of the second portion 402 with the correction value added.

Hence, until immediately before the first state transition, the set of touch point coordinates corresponding to the first portion 401 is directly outputted as the touch input location. Immediately after the first state transition, the set of touch point coordinates corresponding to the second portion 402 is corrected and outputted as the touch input location. As a result, the user can smoothly move the cursor.

The touch point information holding unit 110 holds the touch point information including the set of touch point coordinates detected by the touch location detecting unit 104. The touch point information is read out of or written in the touch point information holding unit 110 by the user operation determining unit 105. It is noted that the touch point information holding unit 110 is not specifically limited in its structure. For example, the touch point information holding unit 110 may be made in any form of data-recordable recording media including the Dynamic Random Access Memory (DRAM), the Static Random Access Memory (SRAM), the flash memory, and the Hard Disc Drive (HDD).

An output signal generating unit 108 converts the touch input location corrected by the touch point coordinate correcting unit 107 into information suitable to output, and outputs the information to a display output unit 109. Specifically, the output signal generating unit 108 converts (maps) the touch input location expressed in the coordinate system of the touch pad 302 into the coordinate system of the display 304, and outputs the converted touch input location.

The display output unit 109 includes a display screen and displays on the display screen a pointer at the location corresponding to the touch input location obtained from the input device 101. In other words, as shown in the example in FIG. 7, the display output unit 109 is equivalent to the display 304 for displaying the cursor 305.

It is noted that, as a matter of course, an external device connected to the input device 101 shall not be limited to the display 304. Equipped with a speaker, for example, the external device may be an audio output device for outputting audio from the speaker at a volume set based on the touch input location obtained from the input device 101. This structure allows the user to vertically slide the finger 301 on the touch pad 302 to adjust the volume. Equipped with a motor (actuator), furthermore, the external device may be a driving device for driving the motor based on the touch input location obtained from the input device 101. In this structure, for example, a motor attached to a joint of a robot arm or a robot leg is driven, so that the user can move the arm and the leg of the robot.

It is noted that the input device 101 and the external device are not necessarily separated with each other; instead, input device 101 and the external device are structured in one unit. For example, the touch pad and the display of a notebook computer may respectively be equivalent to the input device 101 and the display output unit 109.

Described next is the operation of the input device 101 and, in particular, the operation of the touch input location correction device 112, with reference to FIGS. 2 to 6.

Figure 2:
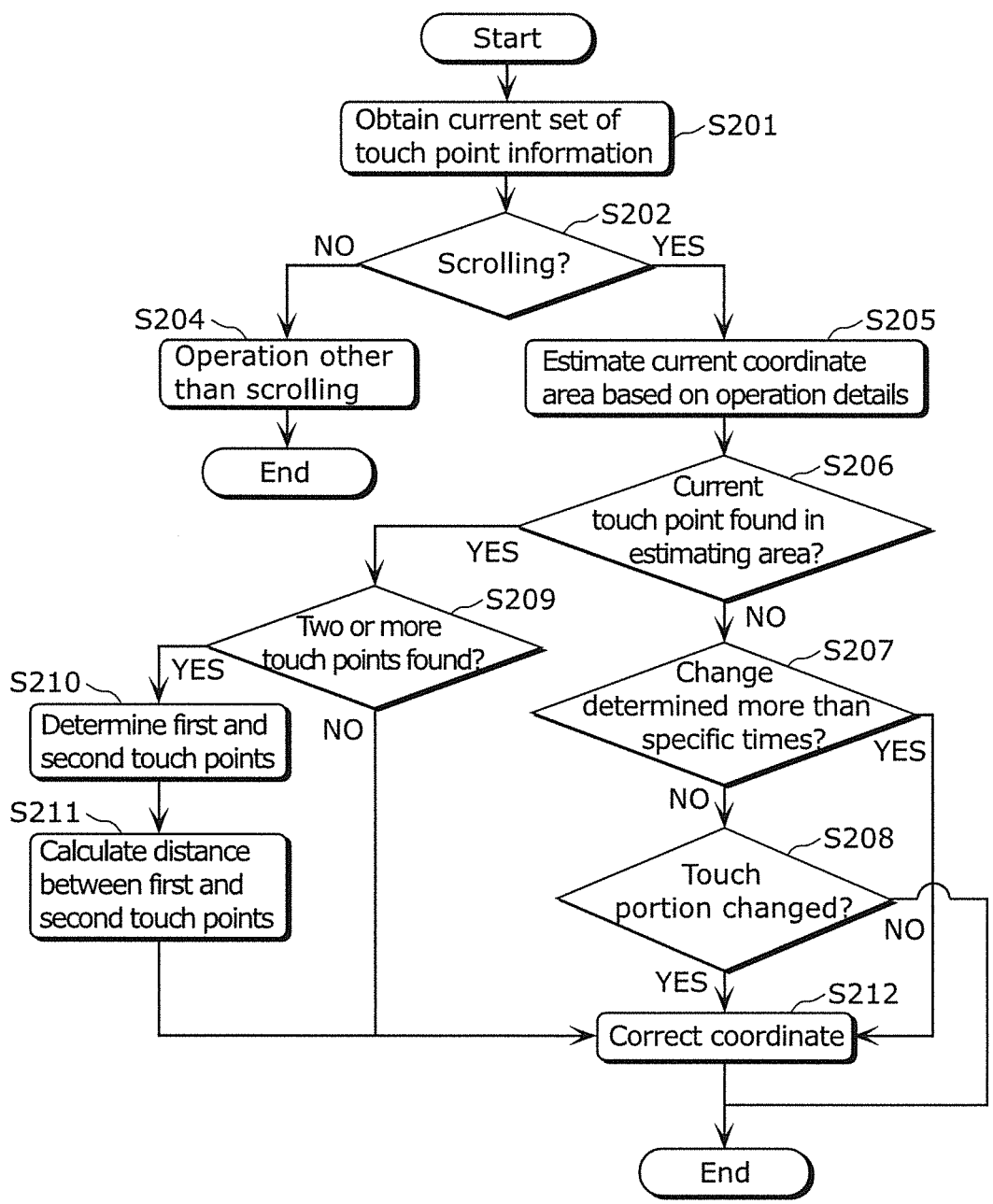
FIG. 2 depicts a process flowchart of the touch input location correction device according to the embodiment of the present invention.
Figure 3:
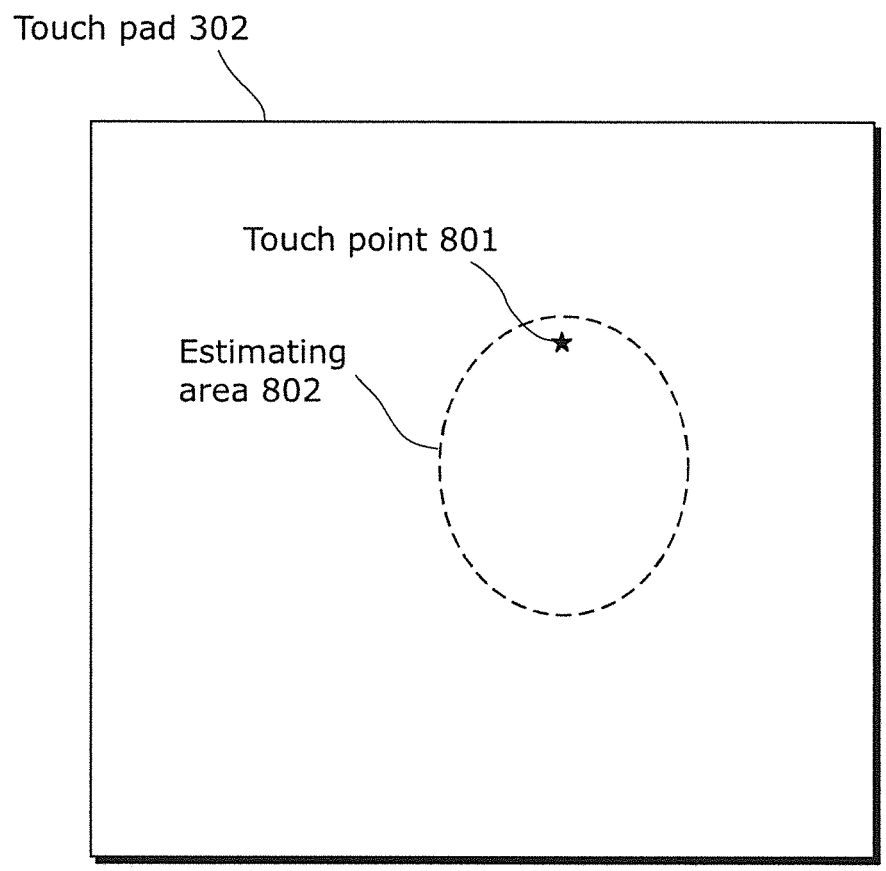
FIG. 3 shows the processing in S205 in FIG. 2.
Figure 4:
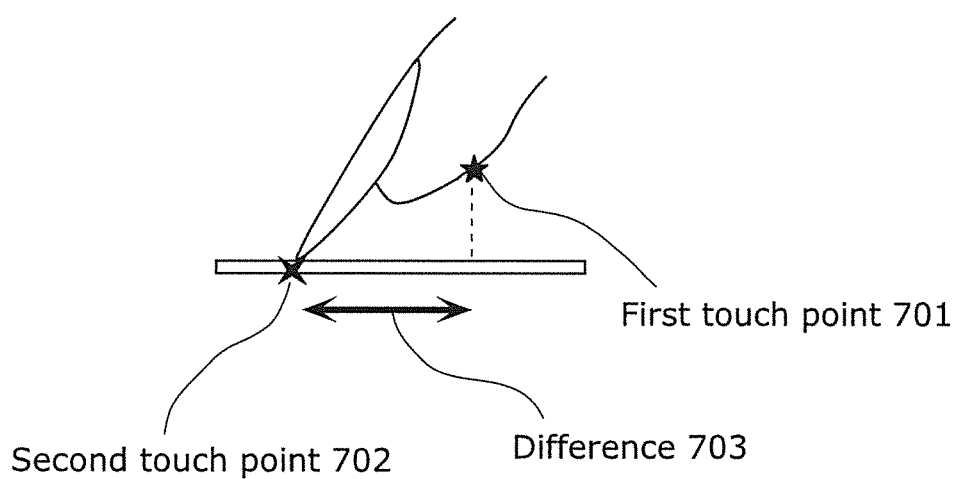
FIG. 4 shows the processing in S211 in FIG. 2.
Figure 5:
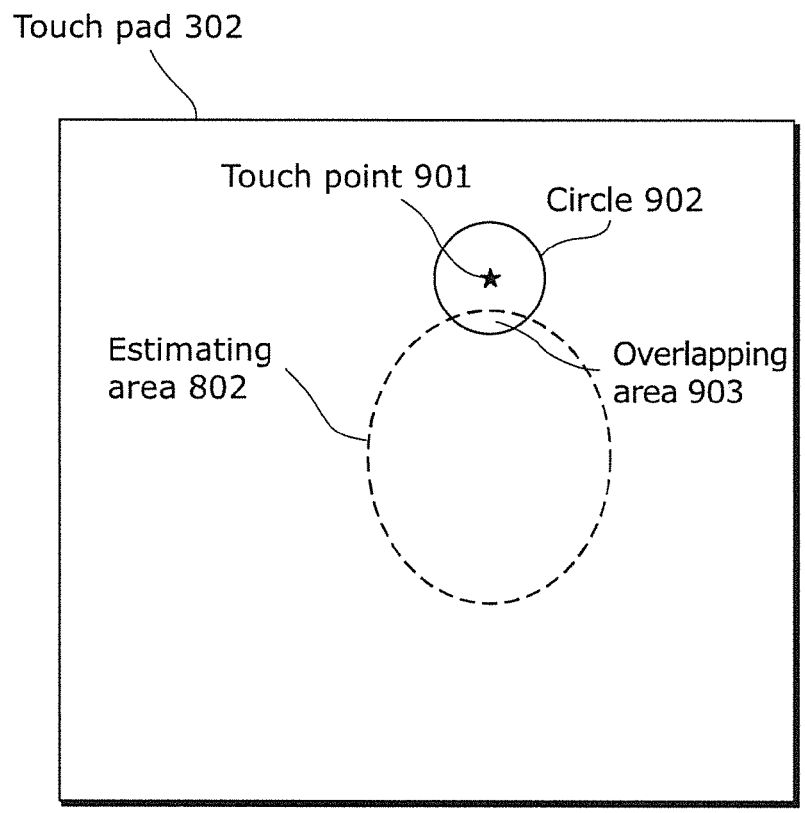
FIG. 5 shows the processing in S208 in FIG. 2.
Figure 6:
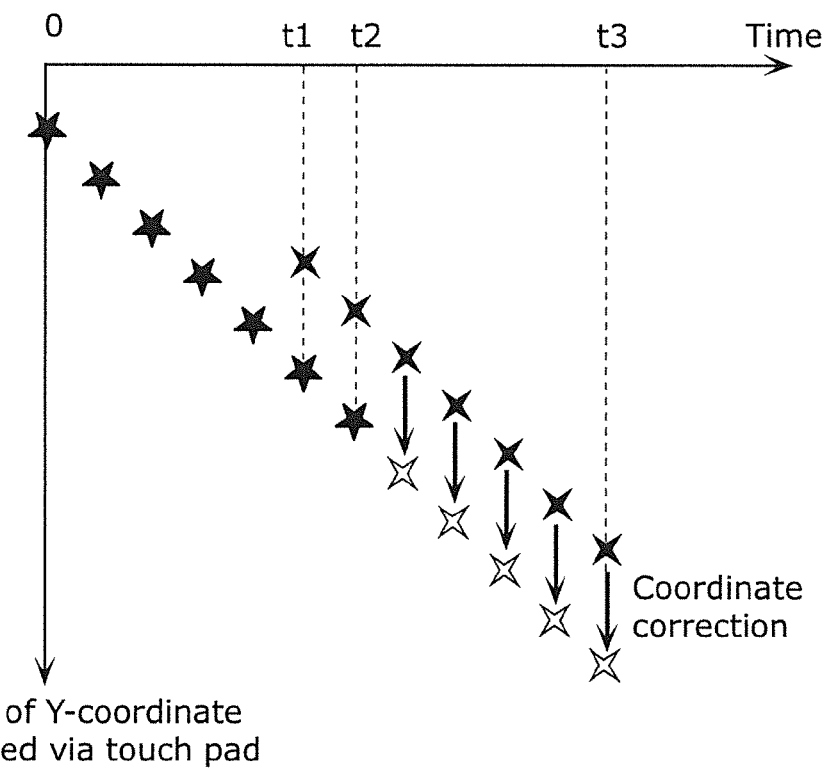
FIG. 6 shows a touch input location to be corrected and outputted in S212 in FIG. 2.

FIG. 2 is a process flowchart of the touch input location correction device 112 according to the embodiment of the present invention. FIG. 3 shows the processing in S205 in FIG. 2. FIG. 4 shows the processing in S215 in FIG. 2. FIG. 5 shows the processing in S208 in FIG. 2. FIG. 6 shows a touch input location to be corrected and outputted in S212 in FIG. 2.

The process in the flowchart in FIG. 2 is executed every time the touch point, inputted on the touch pad 302, is detected by the touch point detecting unit 103. For example, the touch point detecting unit 103 may output, for every predetermined time period, the information on the touch point on the touch pad 302 to the touch location detecting unit 104. Alternately, only in the case of detecting the shift of the touch point on the touch pad 302, the touch point detecting unit 103 may output the information on the after-shift touch point.

Based on the information on the touch point obtained from the touch point detecting unit 103, the touch location detecting unit 104 detects the set of touch point coordinates that is a coordinate set on the corresponding touch area, and outputs the detected set of touch point coordinates to the user operation determining unit 105.

The user operation determining unit 105 obtains a current set of touch point coordinates detected by the touch location detecting unit 104 (S201). Then, the user operation determining unit 105 holds, in the touch point information holding unit 110, touch point information including the obtained set of touch point coordinates.

Alternatively, based on the touch point information held in the touch point information holding unit 110, the user operation determining unit 105 determines the details of the operation that the user is carrying out on the touch pad 302, and holds the operation details. The operation details to be held is either the name of a single operation or the status that operation details are indefinite.

The user operation determining unit 105 determines whether or not the operation that the user is carrying out on the touch pad 302 is scrolling (S202). In the case where the operation is scrolling (S202: YES), the processing S205 is executed. In the case where the operation is not scrolling (S202: NO), the processing S204 is executed.

In the case where the operation is not scrolling (S202: NO), the input device 101 specifies the details of the user operation, and executes the processing for the user operation (S204). In S204, the user operation determining unit 105 obtains necessary touch point information from the touch point information holding unit 110 in order to specify the current operation details, and specifies the details of the user operation which is currently being carried out on the touch pad 302.

Next, the touch portion shift detecting unit 106 estimates an estimating area which is a coordinate area where the current touch point can be found (S205). The estimating area is estimated based on information on the shifting direction and the shifting distance of the touch point calculated based on the operation details that the user is currently carrying out and a set of touch point coordinates detected immediately before. FIG. 3 exemplifies a touch point 801 detected immediately before the current touch point is detected, and an estimating area 802 which possibly includes the current touch point estimated based on the touch point 801.

As shown in FIG. 3, for example, the touch portion shift detecting unit 106 estimates, as the estimating area 802, an oval area including the touch point 801 and stretching toward the user input operation direction 303. The size and the shape of the estimating area 802 varies depending on, for example, the shifting speed of the touch point. In other words, a faster shifting speed of the touch point further ovalizes the estimating area 802 stretched toward the user input operation direction 303. It is noted that the user input operation direction 303 and the shifting speed of the touch point are determined based on previous sets of touch point coordinates.

The touch portion shift detecting unit 106 determines whether or not the current touch point detected by the touch location detecting unit 104 is found in the estimating area estimated in S205 (S206). Specifically, in the case where the current touch point is found in the estimating area 802 shown in a broken line in FIG. 3 (S206: YES), the touch portion shift detecting unit 106 recognizes that the user is scrolling the touch pad 302, and executes the processing in S209. In the case where the current touch point is not found in the estimating area 802 (S206: NO), in contrast, the touch portion shift detecting unit 106 executes the processing in S207 to determine whether or not the user has stopped the scrolling.

In the case of determining that the user is scrolling the touch pad 302 (S206: YES), the touch portion shift detecting unit 106 determines whether or not two or more touch points are found (S209). Such determination is carried out based on the number of the touch points simultaneously detected by the touch location detecting unit 104.

Then, in the case where two or more the touch points are found (S209: YES) as shown in FIG. 8B, for example, the touch portion shift detecting unit 106 executes the processing in S210. In contrast, in the case where two or more touch points are not found (S209: NO), the touch portion shift detecting unit 106 executes the processing in S212. In other words, until immediately before the determination of the second state transition (a second time point), the touch portion shift detecting unit 106 determines NO in S209. After the detection of the second state transition (after the second time point), the touch portion shift detecting unit 106 determines YES in S209.

Next, the touch portion shift detecting unit 106 determines a first touch point and a second touch point (S210). Here, the first touch point and the second touch points are respectively a most suitable touch point and a second-most suitable touch point used for shifting destinations of the touch point detected immediately before. The suitability for the shifting destinations is determined based on the shifting direction and the shifting distance of the touch point.

For example, from among the sets of touch point coordinates detected by the touch location detecting unit 104, the touch portion shift detecting unit 106 may determine (i) a set of touch point coordinates positioned in the estimating area 802 estimated in S205 as the first touch point corresponding to the first portion 401 and (ii) a set of touch point coordinates located outside the estimating area 802 as the second touch point corresponding to the second portion 402.

Then, the touch portion shift detecting unit 106 calculates the relative distance between the first and the second touch points (S211). The relative distance between the first and the second touch points calculated in S211 lies between the first portion (ball of the finger) 401 and the second portion (finger tip) 402 in FIG. 8B. The relative distance between the first and the second touch points calculated in S211 is held in the touch point coordinate correcting unit 107 as a correction value.

FIG. 4 shows the correction value for the coordinates that the touch point coordinate correcting unit 107 uses. A difference 703 between the coordinate sets of the ball of the finger 701 and the finger tip 702 is used as the correction value. FIG. 4 illustrates the same situation as FIG. 8C does; that is, only the finger tip touches the touch pad 302 as the touch portion of the finger 301.

In the case where the touch point coordinate set detected by the touch location detecting unit 104 is not found in the estimating area 802 (S206: NO), the touch portion shift detecting unit 106 determines whether or not the scrolling by the user is canceled and changed to another operation (S207). The touch portion shift detecting unit 106 detects such an operation change by monitoring how often the state with no current touch point is continuously detected (the number of change detection times) in the estimating area 802 estimated based on the user operation details.

In S206, the number of change detection times is (i) incremented by one with every NO determination and (ii) initialized to zero with the YES determination. Then, when the number of change detection times reaches a specific number (S207: YES), the touch portion shift detecting unit 106 determines that there is a change in the operation details, and changes the user operation details to the state where operation details are indefinite, and initializes, to zero, the correction value held in the touch point coordinate correcting unit 107. In the case where the number of change detection times is fewer than the specific number, in contrast, the touch portion shift detecting unit 106 executes the processing in S208.

The processing in S208 and the processing in S212 are respectively executed by the touch portion shift detecting unit 106 and the touch point coordinate correcting unit 107 in FIG. 1.

The touch portion shift detecting unit 106 detects the shift of the touch portion of the user's finger 301 touching on the touch pad 302 and, in particular, detects the first state transition (S208). As a specific detecting technique, the touch portion shift detecting unit 106 detects the first state transition in the cases where, for example, (i) the set of touch point coordinates detected by the touch location detecting unit 104 is located outside the estimating area 802 and (ii) at least part of a circle overlaps with the estimating area 802. Here, the circle has the center positioned at the set of touch point coordinates and the radius is indicated in the correction value calculated in S211. FIG. 5 exemplifies how to detect the shift of the touch portion.

FIG. 5 illustrates a current touch point 901 detected by the touch location detecting unit 104, a circle 902 having the touch point 901 as the center and having the relative distance between the first and the second touch points as the radius, the estimating area 802 estimated in S205, and an overlapping area 903 in which the circle 902 and the estimating area 802 overlap each other. In the case where the overlapping area 903 is found (S208: YES), the touch point coordinate correcting unit 107 determines that first state transition is made, and executes the processing in S212.

In the case where no overlapping area 903 is found (S208: NO), the touch point coordinate correcting unit 107 determines that no first state transition is made, and ends the process. Here, the touch point coordinate correcting unit 107 either avoids outputting the touch input location or outputs, as the touch input location, the same value as the touch input location outputted immediately before.

The touch point coordinate correcting unit 107 corrects the set of touch point coordinates detected by the touch location detecting unit 104, and outputs the corrected coordinate set as the touch input location (S212). FIG. 6 shows the relationship between the set of touch point coordinates detected by the touch location detecting unit 104 and the touch input location outputted from the touch point coordinate correcting unit 107.

Figure 9:
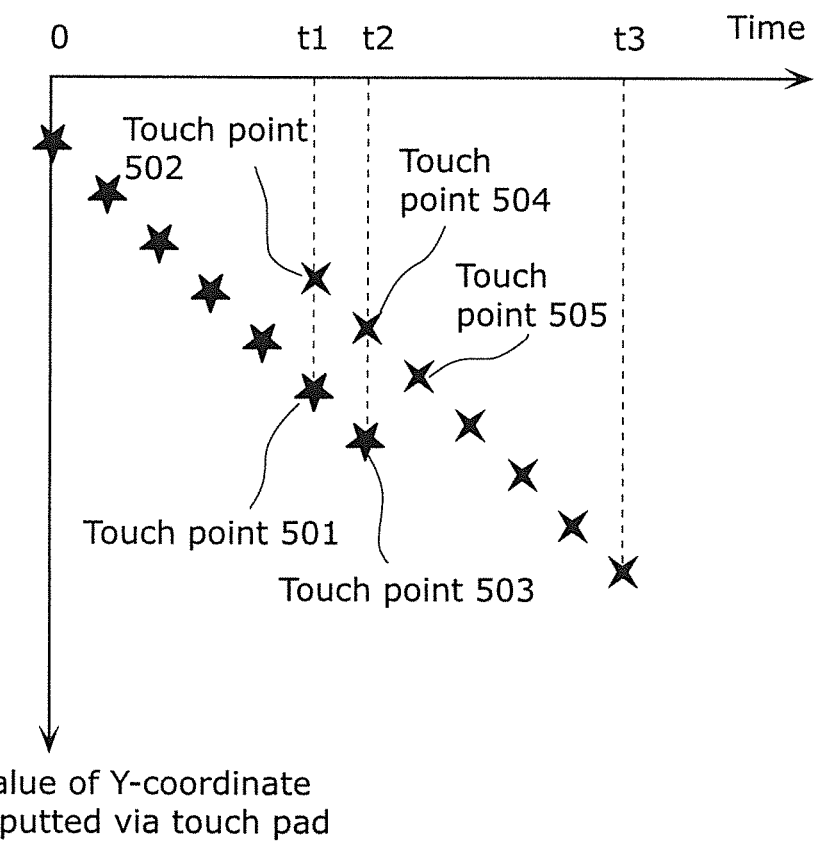
FIG. 9 shows positions of coordinates on the touch pad when the user carries out an input operation.

FIG. 6 is a graph showing the touch input location corrected by the touch point coordinate correcting unit 107 in the touch input location correction device 112 according to the embodiment of the present invention, in addition to the input Y-coordinates on the touch pad 302 shown in FIG. 9. In FIG. 6, white stars having four vertices are the Y-coordinates corrected by the touch point coordinate correcting unit 107.

Conventionally, the cursor is moved between time 0 and time n based on the coordinates indicated in stars having five vertices inputted with the first portion (ball of the finger) 401. After time t2, the cursor is moved based on the coordinates indicated in stars having four vertices inputted with the second portion (finger tip) 402. In the embodiment, however, the touch point coordinate correcting unit 107 in FIG. 1 corrects the coordinates appearing after time t2 (black stars having four vertices) and inputted with the second portion (finger tip) 402 to the locations indicated in the white stars having four vertices.

Specifically, first, from time 0 to time t1, the touch location detecting unit 104 detects only sets of touch point coordinates (stars having five vertices in FIG. 6) corresponding to the first portion 401. Then, the determination YES is made in S206 and S209, and the sets of touch point coordinates are directly outputted as the touch input locations.

Next, from time t1 to time t2, the touch location detecting unit 104 detects two sets of touch point coordinates (stars having five vertices and black stars having four vertices in FIG. 6) corresponding to the first and the second portions 401 and 402. Then, the determination YES is made in S206 and S209, and the sets of touch point coordinates (stars having five vertices) determined as the first touch points in S210 are directly outputted as the touch input locations. In addition, a correction value calculated in S211 is held in the touch point coordinate correcting unit 107.

Next, after time t2, the touch location detecting unit 104 detects only sets of touch point coordinates (black stars having four vertices in FIG. 6) corresponding to the second portion 402. Then, the determination NO is made in S206 and S207, and the determination YES is made in S209. The correction value calculated in S211 is added to the sets of touch point coordinates, and the sets are outputted as the touch input locations (white stars having four vertices in FIG. 6). This correction frees the user from noticing the cursor 305 on the display 304 shifting in a direction opposite the cursor moving direction. Hence, the user can smoothly move the cursor 305 without feeling the change of the touch portion of the finger 301 on the touch pad 302. This feature makes the input device 101 easier for the user to use.

Since the above process involves detecting the change of the touch portions in a single operation executed on the input device 101 and correcting the locations, the operability of the input device 101 improves.

Although only an embodiment of this invention is described, the present invention shall not be limited to the embodiment. The cases below are also included in the scope of this invention.

Each of the aforementioned apparatuses is, specifically, a computer system including a microprocessor, a ROM, a RAM, a hard disk unit, a display unit, a keyboard, a mouse, and so on. A computer program is stored in the RAM or hard disk unit. The respective apparatuses achieve their functions through the microprocessor's operation according to the computer program. Here, the computer program is configured by combining instruction codes indicating instructions for the computer.

A part or all of the constituent elements constituting the respective apparatuses may be configured from a single System-LSI (Large-Scale Integration). The System-LSI is a super-mufti-function LSI manufactured by integrating constituent units on one chip, and is specifically a computer system configured by including a microprocessor, a ROM, a RAM, and so on. A computer program is stored in the RAM. The System-LSI achieves its functions through the microprocessor's operation according to the computer program.

A part or all of the constituent elements constituting the respective apparatuses may be configured as an IC card which can be attached and detached from the respective apparatuses or as a stand-alone module. The IC card or the module is a computer system configured from a microprocessor, a ROM, a RAM, and so on. The IC card or the module achieves its function through the microprocessor's operation according to the computer program. The IC card or the module achieves its function through the microprocessor's operation according to the computer program. The IC card or the module may also be implemented to be tamper-resistant.

The present invention may be a method described above. The present invention may be a computer program for realizing the previously illustrated method, using a computer, and may also be a digital signal including the computer program.

Furthermore, the present invention may also be realized by storing the computer program or the digital signal in a computer readable recording medium such as flexible disc, a hard disk, a CD-ROM, an MO, a DVD, a DVD-ROM, a DVD-RAM, a BD (Blu-ray Disc), and a semiconductor memory. Furthermore, the present invention also includes the digital signal recorded in these recording media.

Furthermore, the present invention may also be realized by the transmission of the aforementioned computer program or digital signal via a telecommunication line, a wireless or wired communication line, a network represented by the Internet, a data broadcast and so on.

The present invention may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another independent computer system is also made possible.

The above embodiment and the above modifications may be combined accordingly.

While an embodiment has been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

[Industrial Applicability]

The present invention is beneficial to input devices including a touch pad and a touch screen.

REFERENCE SIGNS LIST

101 Input device
102 Touch input unit

103 Touch point detecting unit
104 Touch location detecting unit
105 User operation determining unit
106 Touch portion shift detecting unit
107 Touch point coordinate correcting unit
108 Output signal generating unit
109 Display output unit
110 Touch point information holding unit
111 Input operating portion
112 Touch input location correction device
301 Finger
302 Touch pad
303 User input operation direction
304 Display
305 Cursor
306 Cursor moving direction
401 First portion
402 Second portion
501, 502, 503, 504, 505, 801, and 901 Touch point
701 Ball of finger
702 Finger tip
703 Difference
802 Estimating area
902 Circle
903 Overlapping area

The invention claimed is:

1. A touch input location correction device which corrects a touch input location indicating a touch location of a user on a touch area, said device comprising:
a touch location detecting unit configured to detect a set of touch point coordinates for each portion of the user which touches the touch area, the set of touch point coordinates being a set of coordinates corresponding to a touch location of the portion and found on the touch area
a user operation determining unit configured to determine details of an operation carried out by the user based on the set of touch point coordinates detected by said touch location detecting unit;
a touch portion shift detecting unit configured to detect a first state transition based on the set of touch point coordinates detected by said touch location detecting unit at a first time point in a time period during which said user operation determining unit determines that the portion of the user is sliding on the touch area, the first state transition showing transition from a state where the user touches the touch area with both of a first portion and a second portion of the user to a state where the user touches the touch area only with the second portion; and
a touch point coordinate correcting unit configured to (i) correct a set of touch point coordinates of the second portion by adding, to the set of touch point coordinates of the second portion a difference between sets of touch point coordinates of the first portion and the second portion, detected by said touch location detecting unit before the first time point and (ii) output the corrected set of touch point coordinates as the touch input location, the correction and the output being executed after said touch portion shift detecting unit detects the first state transition in the case where the set of touch point coordinates of the first portion is outputted as the touch input location until immediately before the first time point,
wherein said touch point coordinate correcting unit is configured to correct the set of touch point coordinates of the second portion by (i) holding, as a correction value, the difference between the sets of touch point coordinates of the first portion and the second portion detected by said touch location detecting unit before the first time point and (ii) adding the correction value to the set of touch point coordinates, of the second portion, observed after the first time point, and
wherein said touch portion shift detecting unit is configured to:
determine an estimating area based on the set of touch point coordinates of the first portion detected by said touch location detecting unit before the first time point, the estimating area indicating an area in which the first portion is estimated to touch the touch area at the first time point; and
detect the first state transition in the case where (i) the set of touch point coordinates detected by said touch location detecting unit at the first time point is located outside the estimating area and (ii) at least part of a circle overlaps with the estimating area, the circle having a center positioned at the set of touch point coordinates and a radius indicated in the correction value.

2. The touch input location correction device according to claim 1,
wherein said touch portion shift detecting unit is further configured to:
detect a second state transition when said touch location detecting unit detects two sets of touch point coordinates at a second time point (i) in a time period during which said user operation determining unit determines that the portion of the user is sliding on the touch area and (ii) observed before the first time point, the second state transition showing transition from a state where the user touches the touch area only with the first portion to the state where the user touches the touch area with both of the first portion and the second portion; and
determine, as the set of touch point coordinates of the first portion, one of the two sets of touch location coordinates which is located in the estimating area determined based on the set of touch point coordinates of the first portion detected by said touch location detecting unit before the second time point, the two sets of touch location coordinates being detected by said touch location detecting unit at the second time point.

3. The touch input location correction device according to claim 1,
wherein said touch point coordinate correcting unit is configured to avoid outputting the touch input location in the case where at least part of the circle, whose center is the set of touch point coordinates and whose radius is the correction value, does not overlap with the estimating area.

4. The touch input location correction device according to claim 1,
wherein said touch point coordinate correcting unit is configured to set the correction value to zero in the case where the set of touch point coordinates detected by said touch location detecting unit is continuously located, for predetermined times, outside the estimating area determined immediately before.

5. The touch input location correction device according to claim 1,
wherein said touch input location correction device further includes a touch point information holding unit configured to hold the set of touch point coordinates for each time said touch location detecting unit detects the set of touch point coordinates, and
said user operation determining unit is configured to determine whether or not the portion of the user is sliding on the touch area, based on two or more of previous sets of touch point coordinates held in said touch point information holding unit.

6. An input device comprising:
a touch input unit including a touch area; and
said touch input location correction device according to claim 1.

7. The input device according to claim 6 which outputs the touch input location to an external device so as to control the external device, the touch input location being generated based on a user operation received on the touch area,
wherein said external device is one of:
a display device which includes a display screen, and displays on the display screen a pointer at a location corresponding to the touch input location obtained from said input device;
an audio output device which includes a speaker, and outputs audio from the speaker at a volume set based on the touch input location obtained from said input device; and
a driving device which includes a motor, and drives the motor based on the touch input location obtained from said input device.

8. A touch input location correction method for correcting a touch input location indicating a touch location of a user in a touch area, said method comprising:
detecting a set of touch point coordinates for each portion of the user which touches the touch area, the set of touch point coordinates being a set of coordinates corresponding to a touch location of the portion and found on the touch area;
determining details of an operation carried out by the user based on the set of touch point coordinates detected in said detecting the set of touch point coordinates;
detecting a first state transition based on the set of touch point coordinates detected in said detecting the set of touch point coordinates at a first time point in a time period for said determining the details in which the portion of the user is sliding on the touch area, the first state transition showing transition from a state where the user touches the touch area with both of a first portion and a second portion of the user to a state where the user touches the touch area only with the second portion; and
correcting a set of touch point coordinates of the second portion by adding, to the set of touch point coordinates of the second portion, a difference between sets of touch point coordinates, of the first portion and the second portion, detected in said detecting the set of touch point coordinates before the first time point, and outputting the corrected set of touch point coordinates as the touch input location, the correction and the output being executed after the first state transition is detected in the case where the set of touch point coordinates of the first portion is outputted as the touch input location until immediately before the first time point,
wherein said correcting comprises correcting the set of touch point coordinates of the second portion by (i) holding, as a correction value, the difference between the sets of touch point coordinates of the first portion and the second portion detected in said detecting the set of touch point coordinates before the first time point and (ii) adding the correction value to the set of touch point coordinates, of the second portion, observed after the first time point, and
wherein said detecting the first state transition comprises:
determining an estimating area based on the set of touch point coordinates of the first portion detected in said detecting the set of touch point coordinates before the first time point, the estimating area indicating an area in which the first portion is estimated to touch the touch area at the first time point; and
detecting the first state transition in the case where (i) the set of touch point coordinates detected in said detecting the set of touch point coordinates at the first time point is located outside the estimating area and (ii) at least part of a circle overlaps with the estimating area, the circle having a center positioned at the set of touch point coordinates and a radius indicated in the correction value.

9. A non-transitory computer-readable recording medium for use in a computer, said computer medium having a computer program, which causes a computer to correct a touch input location indicating a touch location of a user on a touch area, recorded thereon for causing the computer to execute:
detecting a set of touch point coordinates for each portion of the user which touches the touch area, the set of touch point coordinates being a set of coordinates corresponding to a touch location of the portion and found on the touch area;
determining details of an operation carried out by the user based on the set of touch point coordinates detected in said detecting the set of touch point coordinates;
detecting a first state transition based on the set of touch point coordinates detected in said detecting the set of touch point coordinates at a first time point in a time period for said determining the details in which the portion of the user is sliding on the touch area, the first state transition showing transition from a state where the user touches the touch area with both of a first portion and a second portion of the user to a state where the user touches the touch area only with the second portion; and
correcting a set of touch point coordinates of the second portion by adding, to the set of touch point coordinates of the second portion, a difference between sets of touch point coordinates, of the first portion and the second portion, detected in said detecting the set of touch point coordinates before the first time point, and outputting the corrected set of touch point coordinates as the touch input location, the correction and the output being executed after the first state transition is detected in the case where the set of touch point coordinates of the first portion is outputted as the touch input location until immediately before the first time point,
wherein said correcting comprises correcting the set of touch point coordinates of the second portion by (i) holding, as a correction value, the difference between the sets of touch point coordinates of the first portion and the second portion detected in said detecting the set of touch point coordinates before the first time point and (ii) adding the correction value to the set of touch point coordinates, of the second portion, observed after the first time point, and
wherein said detecting the first state transition comprises:
determining an estimating area based on the set of touch point coordinates of the first portion detected in said detecting the set of touch point coordinates before the first time point, the estimating area indicating an area in which the first portion is estimated to touch the touch area at the first time point; and
detecting the first state transition in the case where (i) the set of touch point coordinates detected in said detecting the set of touch point coordinates at the first time point is located outside the estimating area and (ii) at least part of a circle overlaps with the estimating area, the circle having a center positioned at the set of touch point coordinates and a radius indicated in the correction value.

10. An integrated circuit which corrects a touch input location indicating a touch location of a user in a touch area, said circuit comprising:
- a touch location detecting unit configured to detect a set of touch point coordinates for each portion of the user which touches the touch area, the set of touch point coordinates being a set of coordinates corresponding to a touch location of the portion and found on the touch area;
- a user operation determining unit configured to determine details of an operation carried out by the user based on the set of touch point coordinates detected by said touch location detecting unit;
- a touch portion shift detecting unit configured to detect a first state transition based on the set of touch point coordinates detected by said touch location detecting unit at a first time point in a time period during which said user operation determining unit determines that the portion of the user is sliding on the touch area, the first state transition showing transition from a state where the user touches the touch area with both of a first portion and a second portion of the user to a state where the user touches the touch area only with the second portion; and
- a touch point coordinate correcting unit configured to (i) correct a set of touch point coordinates of the second portion by adding, to the set of touch point coordinates of the second portion, a difference between sets of touch point coordinates, of the first portion and the second portion, detected by said touch location detecting unit before the first time point and (ii) output the corrected set of touch point coordinates as the touch input location, the correction and the output being executed after said touch portion shift detecting unit detects the first state transition in the case where the set of touch point coordinates of the first portion is outputted as the touch input location until immediately before the first time point, wherein said touch point coordinate correcting unit is configured to correct the set of touch point coordinates of the second portion by (i) holding, as a correction value, the difference between the sets of touch point coordinates of the first portion and the second portion detected by said touch location detecting unit before the first time point and (ii) adding the correction value to the set of touch point coordinates, of the second portion, observed after the first time point, and wherein said touch portion shift detecting unit is configured to:

determine an estimating area based on the set of touch point coordinates of the first portion detected by said touch location detecting unit before the first time point, the estimating area indicating an area in which the first portion is estimated to touch the touch area at the first time point and detect the first state transition in the case where (i) the set of touch point coordinates detected by said touch location detecting unit at the first time point is located outside the estimating area and (ii) at least part of a circle overlaps with the estimating area, the circle having a center positioned at the set of touch point coordinates and a radius indicated in the correction value.

* * * * *